(12) United States Patent
Nam et al.

(10) Patent No.: US 11,760,152 B2
(45) Date of Patent: Sep. 19, 2023

(54) CTBA BUSH AND CTBA SUSPENSION SYSTEM

(71) Applicants: Hyundai Motor Company, Seoul (KR); Kia Motors Corporation, Seoul (KR)

(72) Inventors: Shin-Ah Nam, Hwaseong-si (KR); Young-Kyoon Shin, Yongin-si (KR); Min-Soo Kang, Seongnam-si (KR); Back-Gon Ko, Uiwang-si (KR); Sung-Il Kim, Hwaseong-si (KR); Chi-Hoon Lee, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 605 days.

(21) Appl. No.: 16/929,998

(22) Filed: Jul. 15, 2020

(65) Prior Publication Data

US 2021/0276391 A1    Sep. 9, 2021

(30) Foreign Application Priority Data

Mar. 5, 2020    (KR) .................. 10-2020-0027789

(51) Int. Cl.
*B60G 21/055* (2006.01)
*B60G 7/00* (2006.01)

(52) U.S. Cl.
CPC ......... *B60G 21/0551* (2013.01); *B60G 7/001* (2013.01); *B60G 2204/4104* (2013.01); *B60G 2204/45* (2013.01); *B60G 2206/8207* (2013.01)

(58) Field of Classification Search
CPC ........ B60G 7/001; B60G 7/04; B60G 21/055; B60G 21/0551; B60G 21/051; B60G 2204/45; B60G 2204/4104; B60G 2204/41; B60G 2206/427; B60G 2206/8207; B60G 2206/73; B60G 2206/012; B60G 2600/44;
(Continued)

(56) References Cited

U.S. PATENT DOCUMENTS 5,788,265 A * 8/1998 McLaughlin ......... F16F 1/3807
                                                    280/124.169
7,748,689 B2 * 7/2010 Thibault ............... F16F 1/3807
                                                          267/293
(Continued)

FOREIGN PATENT DOCUMENTS

| CN | 205278223 U | * | 6/2016 |
| JP | 10-038002 A | | 2/1998 |
| JP | H1193998 A | * | 4/1999 |

*Primary Examiner* — Robert A. Siconolfi
*Assistant Examiner* — San M Aung
(74) *Attorney, Agent, or Firm* — MORGAN, LEWIS & BOCKIUS LLP

(57) ABSTRACT

A Coupled Torsion Beam Axle (CTBA) bush may include an axial stiffness control portion which forms a cross section of a bush pipe 3 in a cross-sectional structure of additionally securing a gap, the bush pipe generating a rotation against an external load so that lateral stiffness performance and lateral steer performance are enhanced together; and a front and rear stiffness control portion which forms a bush mass in an X-shaped asymmetric bridge structure, the bush mass forming the bush pipe as an external diameter and forming a bush core as an internal diameter so that handling performance and ride comfort performance are enhanced together.

18 Claims, 15 Drawing Sheets

SECTION A-A

(58) Field of Classification Search
CPC ...... B60G 2202/1424; B60G 2204/143; B60G 2204/1222; B60G 2204/1224; B60G 2204/1226; B60G 2204/1482; B60G 2204/4108; B60Y 203/09; F16F 1/38; F16F 1/36; F16F 1/387; F16F 1/3835; F16F 1/3849; F16F 1/373; F16F 1/3732; F16F 15/08; B60K 5/12; B60K 5/1216; B60K 5/1225
USPC .............................. 267/141, 279; 280/124.13
See application file for complete search history.

(56) References Cited

U.S. PATENT DOCUMENTS

| | | | |
|---|---|---|---|
| 8,226,101 B2* | 7/2012 | Lariviere | B60G 11/225 280/124.169 |
| 2004/0041362 A1* | 3/2004 | Hughes | F16F 1/371 280/124.177 |
| 2011/0068550 A1* | 3/2011 | Lariviere | B60G 11/225 280/86.75 |
| 2013/0001915 A1* | 1/2013 | Yamada | F16F 1/3876 280/124.177 |
| 2014/0367546 A1* | 12/2014 | Hibi | F16F 1/3835 248/635 |
| 2014/0367547 A1* | 12/2014 | Ohnishi | F16F 1/3835 267/141 |
| 2015/0183290 A1* | 7/2015 | Kim | B60G 21/052 280/124.128 |

* cited by examiner

SECTION A-A

VIEW B

VIEW B

STEERING STABILITY SIMULATION LINE DIAGRAM

CTBA BUSH AND CTBA SUSPENSION SYSTEM

CROSS-REFERENCE TO RELATED APPLICATION

The present application claims priority to Korean Patent Application No. 10-2020-0027789, filed on Mar. 5, 2020, the entire contents of which is incorporated herein for all purposes by this reference.

BACKGROUND OF THE PRESENT INVENTION

Field of the Invention

The present invention relates to a Coupled Torsion Beam Axle (CTBA) bush, and particularly, to a CTBA suspension system, which improves Riding and Handling (R&H) performance by a CTBA bush to which an X-shaped asymmetric bridge structure and a cross-sectional structure of additionally securing a gap are applied.

Description of Related Art

A bush is applied to a suspension system of a vehicle in which the relative movement is required by including an elastic body to which rubber is applied for the relative movement of connecting parts.

For example, a CTBA bush among the bushes is applied so that each of the left and right trailing arms, which are positioned at both left and right sides of a torsion beam across the left and right wheels in a CTBA suspension system, is fastened to a vehicle body, compensating for the characteristics of the CTBA type suspension system which is structurally weak against the Toe out. In the instant case, the Toe out of the vehicle wheel is a phenomenon which significantly degrades the steering stability of the vehicle by causing an oversteer phenomenon unlike the Toe in.

The CTBA suspension system is classified into a tilting CTBA suspension system and a non-tilting CTBA suspension system according to the application method of the CTBA bush.

For example, the tilting CTBA suspension system has a structure which may generate the rotation moment, which induces the behavior directions of the left and right bushes when a lateral force according to the turning is input, by attaching the left and right CTBA bushes to the left and right trailing arms by setting a predetermined spreading angle (for example, acute angle) as a bush tilting angle. Furthermore, the non-tilting CTBA suspension system has a structure which induces the behavior direction of the left and right bushes without generating the rotation moment when the lateral force according to the turning is input, by attaching the left and right CTBA bushes as the left and right bushes to the left and right trailing arms on the same line (for example, horizontal).

Accordingly, the tilting CTBA suspension system or the non-tilting CTBA suspension system employs the different layout structures for the CTBA bushes, keeping steering, durability, and the like together with Riding and Handling (R&H) and Noise, Vibration, Harshness (NVH) at proper levels.

The contents described in Description of Related Art are to help the understanding of the background of the present invention, and may include what is not previously known to those skilled in the art to which an exemplary embodiment of the present invention pertains.

However, the axial stiffness (that is, lateral cross-sectional stiffness of the bush) and the front and rear stiffness (that is, longitudinal cross-sectional stiffness of the bush), which are performance factors of the CTBA bush, produces conflicting results, making it difficult to improve the bush for improving the Riding and Handling (R&H) performance, which becomes more important.

The CTBA bush applied to the non-tilting CTBA suspension system has the characteristics which are more disadvantageous in lateral force steering performance than the CTBA bush applied to the tilting CTBA suspension system, relative to the advantage in which the tuning is easy in the same bush changing direction between the lateral stiffness and the lateral steer.

Accordingly, the CTBA bush of the non-tilting CTBA suspension system is inevitably degraded in the Riding and Handling (R&H) performance required for improving merchantability of the vehicle, as compared to the CTBA bush of the tilting CTBA suspension system.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a CTBA suspension system, which has the optimized Riding and Handling (R&H) performance while keeping the lateral stiffness and lateral steer performance, by employing a CTBA bush in which, at the time of designing the bush, to improve the axial stiffness and the front and rear stiffness, which are the conflicting performance factors, an X-shaped asymmetric bridge structure of a bush mass, which is an elastic body, is combined with a cross-sectional structure of additionally securing a gap of a bush pipe, which generates the rotation against the external load.

A CTBA bush according to an exemplary embodiment of the present invention for achieving the object includes: an axial stiffness control portion which forms a cross section of a bush pipe in a cross-sectional structure of additionally securing a gap, the bush pipe generating a rotation against an external load so that lateral stiffness performance and lateral steer performance are enhanced together; and a front and rear stiffness control portion which forms a bush mass in an X-shaped asymmetric bridge structure, the bush mass forming the bush pipe as an external diameter and forming a bush core as an internal diameter so that handling performance and ride comfort performance are enhanced together.

As an exemplary embodiment of the present invention, the front and rear stiffness control portion forms the X-shaped asymmetric bridge structure with a handling bridge and a riding bridge, and the shape of the bush mass is formed of an X-shaped mass body in which the handling bridge and the riding bridge are crossed.

As an exemplary embodiment of the present invention, a bridge thickness of the handling bridge is formed to be greater than a bridge thickness of the riding bridge such that the handling bridge and the riding bridge have different bridge thicknesses from each other, and the bridge inclined angle of the handling bridge is formed to be greater than the bridge inclined angle of the riding bridge such that the handling bridge and the riding bridge have different bridge inclined angles from each other with respect to the center portion of a bush.

As an exemplary embodiment of the present invention, as the ratio of the bridge thickness, the thickness of the handling bridge is set as 1.35 with respect to the thickness of the riding bridge, and as the ratio of the bridge inclined angle, the inclined angle of the handling bridge as 1.75 with respect to the inclined angle of the riding bridge.

As an exemplary embodiment of the present invention, the axial stiffness control portion forms the cross-sectional structure of additionally securing a gap with a front gap stepped pipe and a rear gap stepped pipe with respect to the lateral cross-sectional center portion of the bush pipe, and the cross-sectional structure of additionally securing a gap forms a front gap width formed between the front gap stepped pipe and the bush core and a rear gap width formed between the rear gap stepped pipe and the bush core.

As an exemplary embodiment of the present invention, the front gap stepped pipe and the rear gap stepped pipe are formed in a certain section in a longitudinal direction of the bush pipe.

As an exemplary embodiment of the present invention, the front gap width and the rear gap width form a difference between the front gap width and the rear gap width due to the sizes of different widths from each other, and the difference between the front gap width and the rear gap width occurs by forming the size of the front gap width to be greater than the size of the rear gap width.

As an exemplary embodiment of the present invention, as the ratio of the gap thickness, the gap thickness of the front gap stepped pipe is set as 0.52 with respect to the rear gap stepped pipe.

As an exemplary embodiment of the present invention, the bush mass is provided with an internal stopper at one side thereof and an external stopper at the opposite side thereof, the internal stopper being positioned in a space of a void formed in the bush mass, and the external stopper being coupled to a mass body end portion of the bush mass to be spaced from the bush pipe.

As an exemplary embodiment of the present invention, the external stopper includes a contact rib which is embossed in a radial direction of the surface of the external stopper.

Furthermore, a CTBA suspension system according to an exemplary embodiment of the present invention for achieving the object includes: a CTBA bush which has a bush mass between a bush core which does not generate the rotation against an external load and a bush pipe which generate the rotation against the external load, and has a stiffness control portion in which a cross-sectional structure of additionally securing a gap and an asymmetric bridge structure are combined, the cross-sectional structure of additionally securing a gap being formed by a difference between the width sizes of a front gap width and a rear gap width on the internal circumferential surface of the bush pipe so that lateral stiffness performance and lateral steer performance are enhanced together and the asymmetric bridge structure being formed of an X-shaped mass body of the bush mass so that handling performance and ride comfort performance are enhanced together; a CTBA which is mounted to traverse a vehicle width; a left trailing arm which is fastened to one side of the CTBA by setting the CTBA bush as a left CTBA bush; and a right trailing arm which is fastened to the opposite side of the CTBA by setting the CTBA bush as a right CTBA bush.

As an exemplary embodiment of the present invention, each of the left CTBA bush and the right CTBA bush is formed with a fastening position indicator, and the fastening position indicator discriminates the left trailing arm from the right trailing arm.

As an exemplary embodiment of the present invention, a fastening method of the left CTBA bush and the left trailing arm and a fastening method of the right CTBA bush and the right trailing arm do not employ a bush tilting angle so as not to generate the rotation moment by a lateral force according to the turning.

As an exemplary embodiment of the present invention, a fastening method of the left CTBA bush and the left trailing arm and a fastening method of the right CTBA bush and the right trailing arm employ a bush tilting angle to generate the rotation moment by a lateral force according to the turning.

The CTBA bush applied to the CTBA suspension system according to an exemplary embodiment of the present invention implements the following operations and effects.

Firstly, it is possible to manufacture the CTBA bush having the optimized Riding and Handling (R&H) performance without degrading the lateral stiffness and the lateral steer performance, required for the CTBA bush, with the optimization by the mutual combination of the axial stiffness and the front and rear stiffness. Secondly, by applying the left/right asymmetrical design to the vulcanizing mass between the internal/external pipes, it is possible to eliminate the difficulty of designing the CTBA bush due to the conflict of the performance factors such as an increase in the handling performance but degradation in the ride comfort performance when the front/rear stiffness is increased. Thirdly, any one or more of the external stopper structure, the external stopper surface radial embossment structure, and the front/rear stopper gap dualization structure may be variously added as the bush external structure in the state where the left/right asymmetric vulcanizing mass structure is applied as the bush internal structure. Fourthly, by adding the external stopper structure as the bush external structure, it is possible to reduce the Toe-out of the lateral force. Fifthly, by adding the external stopper surface radial embossment structure as the bush external structure, it is possible to improve the handling performance by increasing the contact efficiency of the projection. Sixthly, by adding the front/rear stopper gap dualization structure as the bush external structure, it is possible to improve the ride comfort by increasing the bush linearity. Seventhly, by implementing the non-tilting CTBA suspension system with the CTBA bush having the optimized lateral stiffness and lateral steer performance and R&H performance, it is possible to implement the same lateral steer performance as the tilting CTBA suspension system. Eighthly, it is possible to significantly improve the merchantability of the vehicle to which the non-tilting CTBA suspension system is applied.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
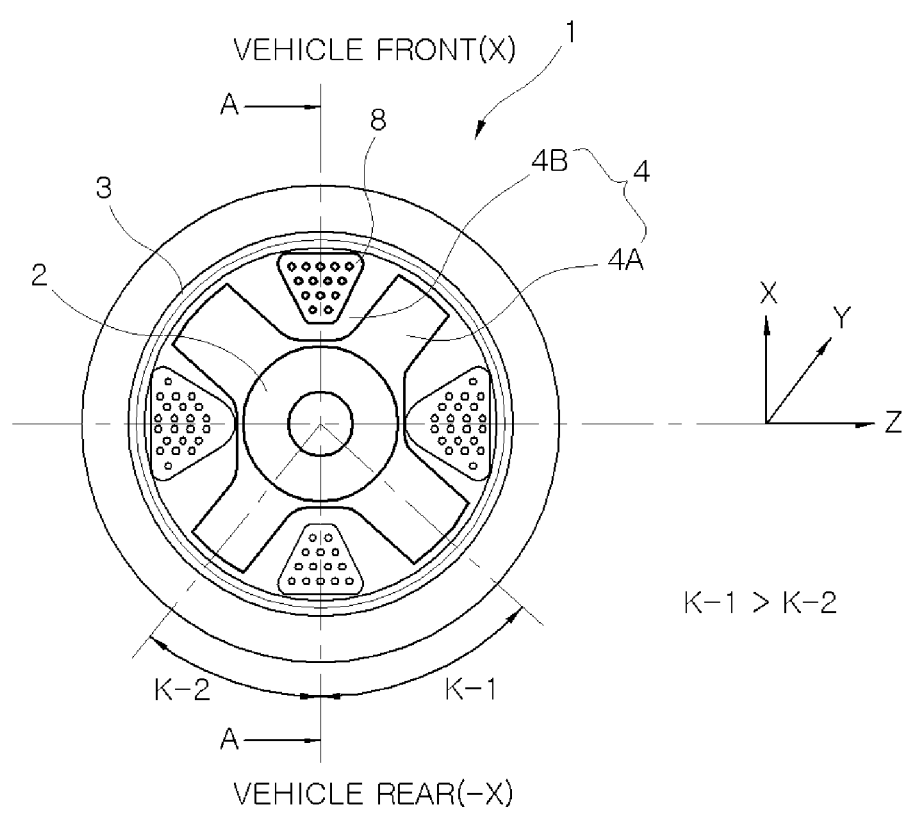
FIG. 1 and FIG. 2 are diagrams illustrating a configuration of a CTBA bush according to an exemplary embodiment of the present invention to which a stiffness control portion is applied.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, embodiments of the present invention will be described in detail with reference to the accompanying exemplary drawings, and these embodiments are illustrative only and those skilled in the art to which an exemplary embodiment of the present invention pertains may implement embodiments in various different forms, such that the present invention is not limited to the exemplary embodiments described herein.

Figure 2:
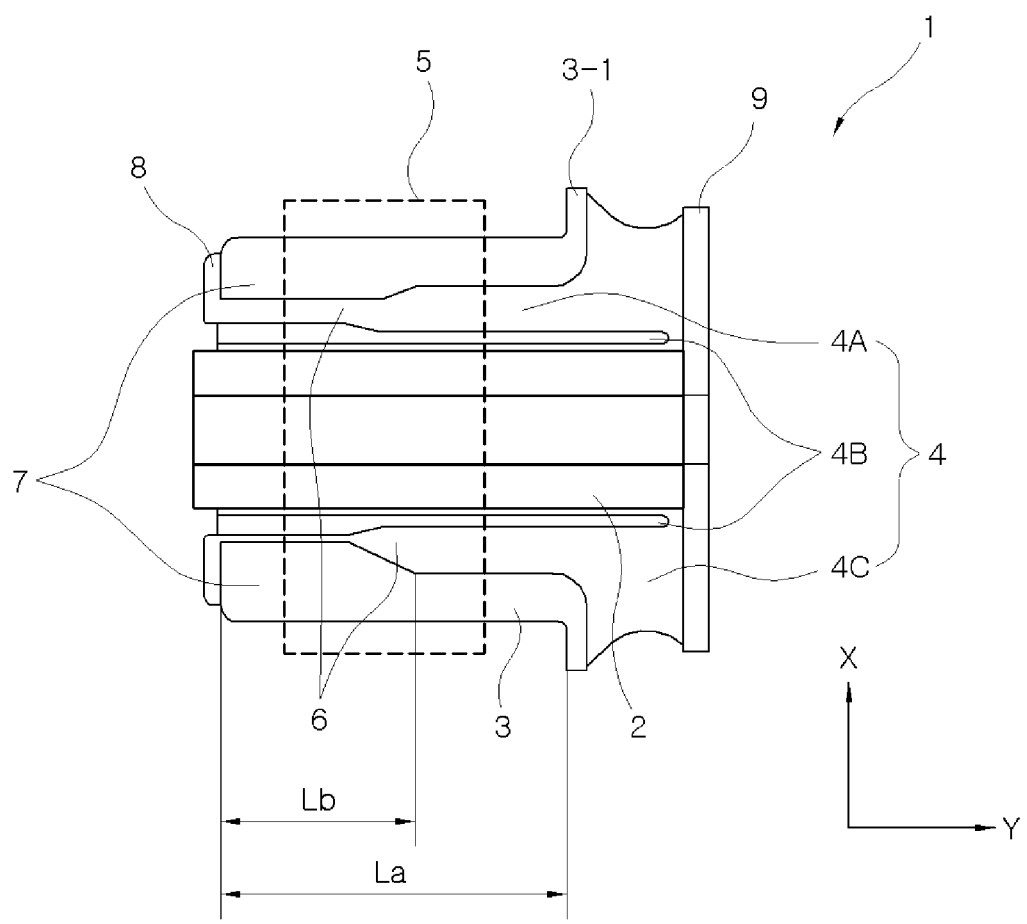

Referring to FIG. 1 and FIG. 2, a Coupled Torsion Beam Axle (CTBA) bush 1 provides, as a basic component, basic performance of a bush for Noise, Vibration, Harshness (NVH), steering, and durability and provides, an additional component, improved performance for Riding and Handling (R&H) performance by strengthening the axial stiffness/ front and rear stiffness/linearity/lateral stiffness of the bush in the relative movement of the connecting parts.

The basic component includes a bush core 2 which functions as an internal pipe, a bush pipe 3 which functions as an external pipe, and a bush mass 4 which functions as an elastic body. In the instant case, the bush mass 4 is vulcanized-shaped and formed between the bush core 2 and the bush pipe 3.

For example, the bush core 2 is fastened to the connecting portions to keep a fixed state against the road surface input load, and is made of steel or engineering plastic. The bush pipe 3 is rotated in a direction opposite to the bush mass 4 with the road surface input load, and is made of engineering plastic to form a stronger stiffness than the stiffness of the bush mass 4. The bush mass 4 is rotated in a direction opposite to the bush pipe 3 to generate elastic deformation, and is made of rubber to form a weaker stiffness than the stiffness of the bush pipe 3.

The bush core 2 has a hollow pipe shape, and one side end portion of both left and right sides thereof is formed to have a length which is not surrounded by the bush mass 4, and the bush pipe 3 has a hollow pipe shape, and a pipe flange 3-1 having a relatively large diameter is formed at one side end portion of both left and right sides thereof.

Furthermore, the bush mass 4 includes an X-shaped mass body 4A, a void 4B, and a mass end body 4C. The X-shaped mass body 4A produces the cross section of the bush mass in an X-shape by use of an X-shaped bridge width where the bush core 2 is positioned at the center portion thereof, the void 4B produces an empty space, which is not occupied by the X-shaped bridge width, in the bush mass to have one end opening shape (that is, one side open shape), and the mass end body 4C is provided to a site which extends to a position out of the bush pipe 3 (that is, the pipe flange 3-1) and forms the end portion where the void 4B is blocked.

The additional component includes a stiffness control portion 5 which strengthens the axial stiffness/front and rear stiffness to improve Riding and Handling performance of the bush and stoppers 8, 9 which strengthens the lateral stiffness to strengthen the lateral Toe-in tendency of the bush.

For example, the stiffness control portion 5 includes a front and rear stiffness control portion 6 which is formed of the X-shaped mass body 4A of the bush mass 4 to strengthen the front and rear stiffness to improve the ride comfort and handling of the bush, and an axial stiffness control portion 7 which is formed of the internal circumferential surface of the bush pipe 3 to strengthen linearity to improve the ride comfort of the bush, and improves the Riding and Handling (R&H) performance by a combination of the front and rear stiffness control portion 6 and the axial stiffness control portion 7.

The axial stiffness control portion 7 is formed in an opposite direction of the pipe flange 3-1 of the bush pipe 3 in a longitudinal direction of the bush pipe 3 (that is, longitudinal direction of the lateral cross section of the bush), and is formed to have a stiffness control length (Lb) having 45 to 55% of a total length (La) of the bush pipe 3. In the instant case, a value of the ratio of the stiffness control length (La) may be changed depending on a difference in the stiffness between the bush pipe 3 and the bush mass 4.

For example, the stoppers 8, 9 are classified into an internal stopper 8 which is provided in the bush mass 4 at one side thereof (that is, left direction) and an external stopper 9 which is provided in the bush mass 4 at the opposite (that is, right direction) thereto with respect to the pipe flange 3-1 of the bush pipe 3. In the instant case, the internal stopper 8 is formed integrally with the X-shaped mass body 4A by use of the space of the void 4B formed in the bush mass 4, and the external stopper 9 is vulcanized-attached to the mass end portion body 4C which forms the bush mass 4.

The internal stoppers 8 are each positioned in the spaces of the voids 4B which are formed in four places by the shape of an X-shaped mass body 4A.

Accordingly, the CTBA bush 1 includes the bush core 2, the bush pipe 3, the bush mass 4, a handling bridge 6-1, a riding bridge 6-2, a front gap stepped pipe 7-1, a rear gap stepped pipe 7-2, the internal stopper 8, and the external stopper 9.

Meanwhile, FIG. 3, FIG. 4, FIG. 5 and FIG. 6 illustrate detailed structures of the front and rear stiffness control portion 6, the axial stiffness control portion 7, the internal stopper 8, and the external stopper 9.

Figure 3:
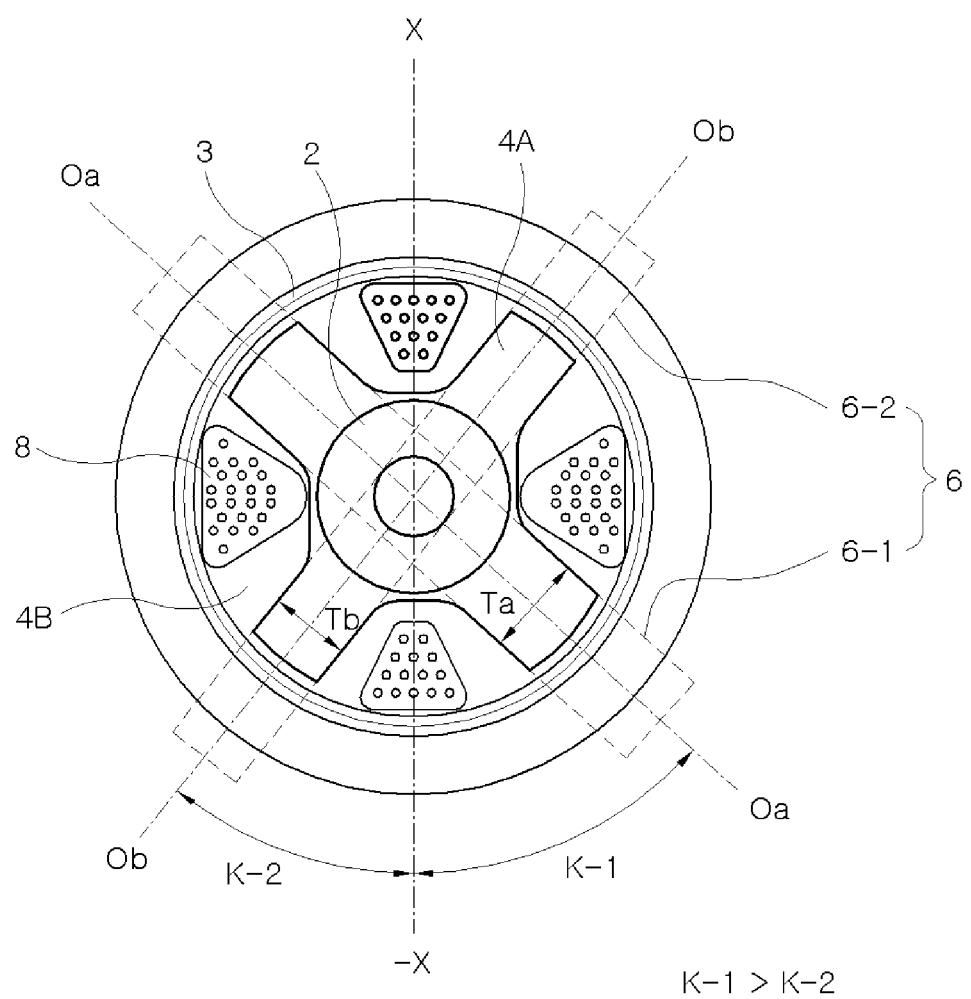
FIG. 3 is a diagram illustrating an example to which a front and rear stiffness control portion for the front and rear stiffness (that is, longitudinal cross-sectional stiffness of the bush) is applied to a stiffness control portion by the bridge thickness difference between a Handing bridge and a Riding bridge of an X-shaped mass body of the CTBA bush according to an exemplary embodiment of the present invention.

Referring to FIG. 3, the front and rear stiffness control portion 6 is formed so that the X-shape mass body 4A of the bush mass 4 is classified into the handling bridge 6-1 and the riding bridge 6-2 with respect to the X-axis of the CTBA bush 1 which indicates a vehicle front (X) and a vehicle rear (−X).

The handling bridge 6-1 and the riding bridge 6-2 form an X-shape crossing the center portion of the bush mass 4 to be matched with the shape of the X-shaped mass body 4A.

The handling bridge 6-1 and the riding bridge 6-2 classify the bridge inclined angle into a handling inclined angle (K-1) and a riding inclined angle (K-2) which have different angles from each other and classify the bridge thickness into a handling bridge thickness (Ta) and a riding bridge thickness (Tb) which have different values from each other.

For example, the handling bridge 6-1 forms the width of one line of the X shape at the handling bridge thickness (Ta) while forming a handling line (Oa-Oa), passing through the center portion of the CTBA bush 1 at one side of the X-axis, at an acute handling inclined angle (K-1) with respect to the X-X axis, and the riding bridge 6-2 forms the width of the opposite line of the X shape at the riding bridge thickness (Tb) while forming a riding line (Ob-Ob), passing through the center portion of the CTBA bush 1 at the opposite side of the X axis, at the acute riding inclined angle (K-2) with respect to the X-X axis.

Accordingly, the handling line (Oa-Oa) of the handling bridge 6-1 and the riding line (Ob-Ob) of the riding bridge 6-2 cross each other at the center portion of the CTBA bush 1 to form an X-shape, being matched with the shape of the X-shaped mass body 4A.

The handling inclined angle (K-1) of the handling bridge 6-1 is provided as the optimum angle confirmed through the design in an angle range which strengthens the handling performance against the road surface input load, and the riding inclined angle (K-2) of the riding bridge 6-2 is provided as the optimum angle confirmed through design in an angle range which strengthens the riding comfort performance against the road surface input load, such that the handling inclined angle (K-1) is applied to be greater than the riding inclined angle (K-2).

Accordingly, the handling inclined angle (K-1) and the riding inclined angle (K-2) may be set as an optimum angle ratio. For example, the angle ratio of the handling inclined angle (K-1) and the riding inclined angle (K-2) is set as 1.75 as the optimum angle ratio.

Furthermore, the handling bridge thickness (Ta) of the handling bridge 6-1 is provided as the optimum thickness confirmed through the design in a thickness range which strengthens the handling performance against the road surface input load, and the riding bridge thickness (Tb) of the riding bridge 6-2 is provided as the optimum thickness confirmed through the design in a thickness range which strengthens the ride comfort performance against the road surface input load, such that the handling bridge thickness (Ta) is applied to be greater than the riding bridge thickness (Tb).

Accordingly, the handling bridge thickness (Ta) and the riding bridge thickness (Tb) may be set as the optimized thickness ratio. For example, the thickness ratio of the handling bridge thickness (Ta) and the riding bridge thickness (Tb) is set as 1.35 as the optimum thickness ratio.

Accordingly, the handling bridge 6-1 forms the handling inclined angle (K-1) having a relatively large angle and the handling bridge thickness (Ta) having a relatively large thickness, whereas the riding bridge 6-2 forms the riding inclined angle (K-2) having a relatively small angle and the riding bridge thickness (Tb) having a relatively small thickness, such that the left and right asymmetrical layout is applied to the X-shaped mass body 4A of the bush mass 4, improving the handling performance in a state where the front and rear stiffness (that is, longitudinal cross-sectional stiffness of the bush) is kept.

The characteristics of the handling bridge 6-1 and the riding bridge 6-2 described above can contribute to eliminating the difficulty in the design due to the chronic conflicting problem between the performance factors of the CTBA bush 1 which improves the handling performance, but degrades the ride comfort performance when the front and rear stiffness is increased.

Figure 4:
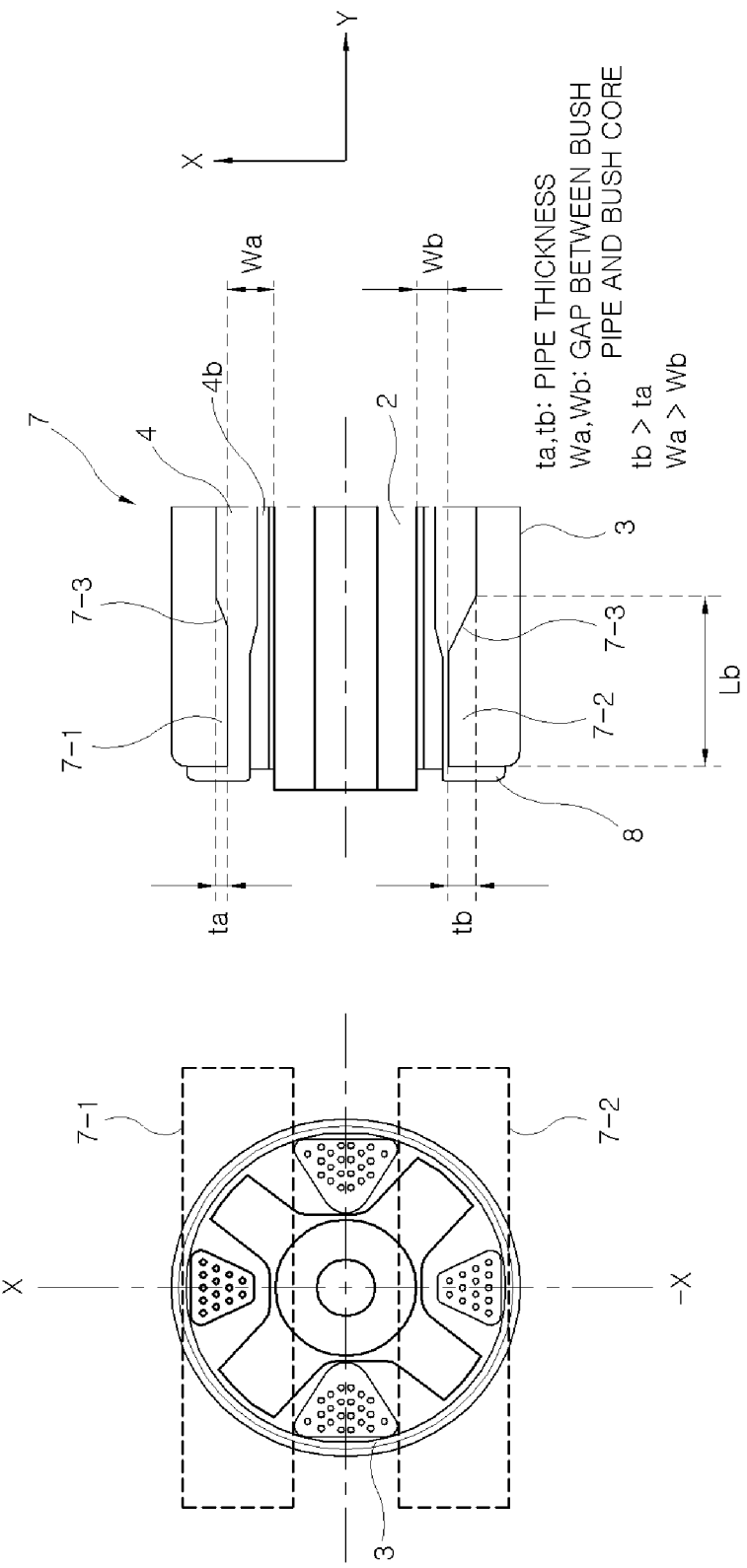
FIG. 4 is a diagram illustrating an example to which an axial stiffness control portion for the axial stiffness (that is, lateral cross-sectional stiffness of the bush) is applied to the stiffness control portion by the gap thickness difference between a front gap pipe and a rear gap pipe in a bush pipe (that is, external pipe) of the CTBA bush according to an exemplary embodiment of the present invention.

Referring to FIG. 4, the axial stiffness control portion 7 is classified into the front gap stepped pipe 7-1 and the rear gap stepped pipe 7-2 which have the gap thickness at different values from each other on the internal circumferential surface of the bush pipe 3 with respect to the X-axis of the CTBA bush 1 indicating the vehicle front (X) and the vehicle rear (−X).

The front gap stepped pipe 7-1 forms a front pipe internal thickness (ta) by setting the vehicle front (X) side as a front semicircular section of the bush pipe 3, whereas the rear gap stepped pipe 7-2 forms a rear pipe internal thickness (tb) by setting the vehicle rear (−X) as a rear semicircular section of the bush pipe 3. The front pipe internal thickness (ta) forms a front gap between the bush pipe 3 and the bush core 2, and the rear pipe internal thickness (tb) forms a rear gap between the bush pipe 3 and the bush core 2, so that the bush pipe 3 may form a difference between the front/rear gaps with respect to the bush core 2.

For example, the front pipe internal thickness (ta) of the front gap stepped pipe 7-1 is provided as the optimum thickness confirmed through the design in a thickness range which forms a primary linearity increment section (that is, vehicle front direction) of the bush mass 4 against the road surface input load, whereas the rear pipe internal thickness (tb) of the rear gap stepped pipe 7-2 is provided as the optimum thickness confirmed through the design in a thickness range which forms a secondary linearity increment section (that is, vehicle rear direction) of the bush mass 4 against the road surface input load.

That is, the front gap stepped pipe 7-1 forms the front pipe internal thickness (ta) having a relatively small thickness, whereas the rear gap stepped pipe 7-2 forms the rear pipe internal thickness (tb) having a relatively large thickness, so that the bush pipe 3 may form the front and rear stopper gap dualization layout through the combination thereof while applying the rear pipe internal thickness (tb) greater (that is, thicker) than the front pipe internal thickness (ta).

To this end, the front pipe internal thickness (ta) and the rear pipe internal thickness (tb) may be set as the optimized gap thickness ratio. For example, the gap thickness ratio of the front pipe internal thickness (ta) and the rear pipe internal thickness (tb) is set as 0.52 as the optimum gap thickness ratio.

As a result, the size of a front gap width (Wa) between the bush pipe 3 and the bush core 2 by the front pipe internal thickness (ta) is formed to be greater than the size of a rear gap width (Wb) between the bush pipe 3 and the bush core 2 by the rear pipe internal thickness (tb), and a difference between these front/rear gap widths (Wa−Wb) enables the front semicircular section of the bush pipe 3 to additionally secure the front gap as compared to the rear semicircular section, further improving the ride comfort by the bush linearity increment effect.

That is, the front gap width (Wa) formed by the bush pipe 3 with respect to the bush core 2 may form the primary linearity increment section (that is, vehicle front direction) in the bush mass 4 against the road surface input load, and the rear gap width (Wb) formed by the bush pipe 3 with respect to the bush core 2 may form the secondary linearity increment section (that is, vehicle rear direction) in the bush mass 4 against the road surface input load.

Furthermore, a stepped surface 7-3 is formed on each of the front gap stepped pipe 7-1 and the rear gap stepped pipe 7-2, and the stepped surface 7-3 is formed with an inclined angle at an acute angle toward the pipe flange 3-1 of the bush pipe 3, increasing the vulcanization adhesion of the bush mass 4 to the X-shaped mass body 4A.

Figure 5:
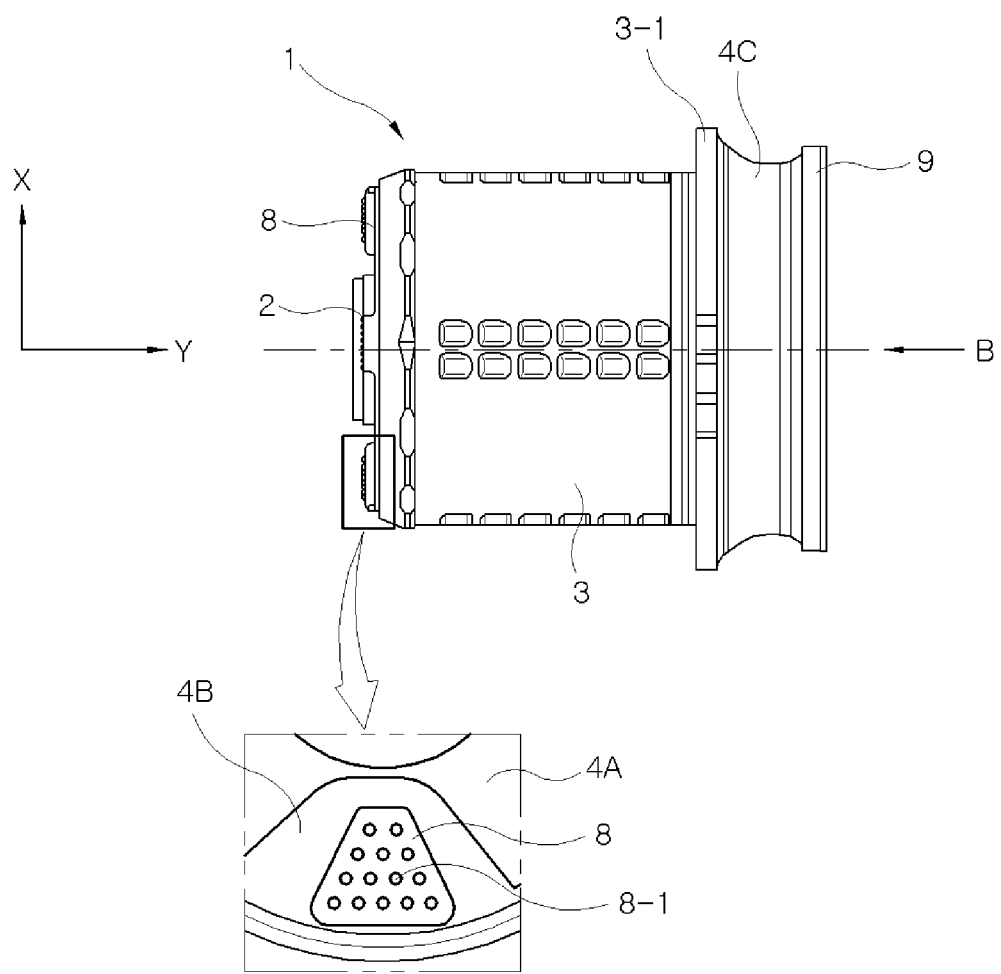
FIG. 5 and FIG. 6 are diagrams illustrating an example of the layout of the CTBA bush in which an internal stopper and an external stopper are provided at the axial left and right of the bush according to an exemplary embodiment of the present invention.
Figure 6:
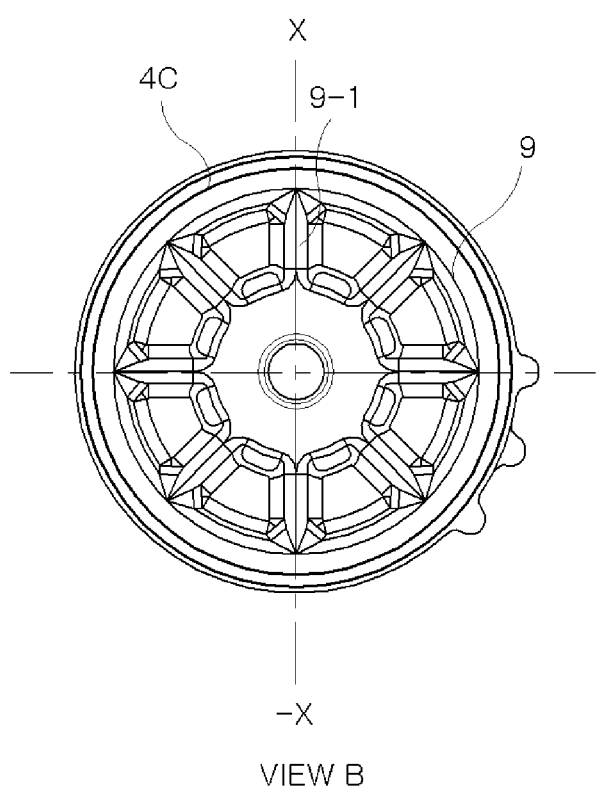

Referring to FIG. 5 and FIG. 6, the internal stopper 8 has an exposed length from the bush pipe 3 at one side of the pipe flange 3-1, keeping durability of the CTBA bush 1 by contacting with the relative portion (for example, vehicle body) upon behavior of the CTBA bush 1 against the road surface input load. In the instant case, the internal stopper 8 is formed at the end portion of the void 4B to configure the bush mass 4 as a structure integrally formed with the X-shaped mass body 4A.

The internal stopper 8 contributes to improving the durability by improving a contact force by forming a plurality of contact projections 8-1 on a contact surface thereof.

Furthermore, the external stopper 9 is vulcanized-adhered to the mass end body 4C of the bush mass 4 at the opposite side of the pipe flange 3-1 to be spaced from the pipe flange 3-1 by a length of the mass end body 4C, and formed of a disc shape.

Accordingly, the external stopper 9 reduces the lateral force Toe out when the road surface input load due to the turning acts as the lateral force.

The external stopper 9 has a contact rib 9-1, and the contact rib 9-1 is embossed in the radial direction of the surface of the external stopper 9, contributing to improving the handling performance by increasing the contact efficiency through the circumferential outermost projection.

Figure 7:
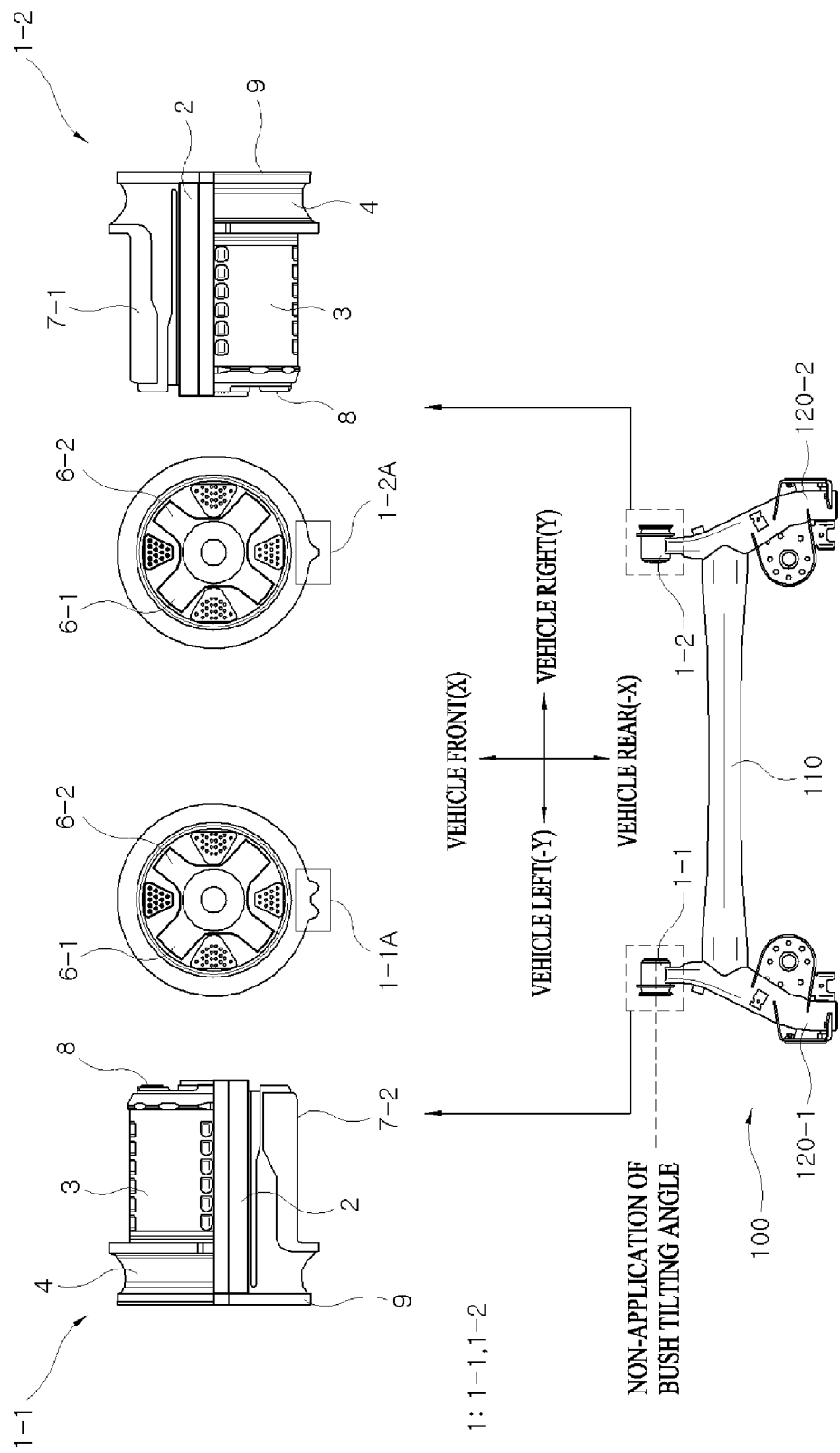
FIG. 7 is a diagram illustrating an example of a non-tilting CTBA suspension system of CTBA suspension systems according to an exemplary embodiment of the present invention, to which the CTBA bush is applied without a bush tilting angle.

Meanwhile, FIG. 7 illustrates an example of a non-tilting CTBA suspension system 100 of the CTBA suspension systems, to which the CTBA bush 1 is applied.

As illustrated, the non-tilting CTBA suspension system 100 includes a left CTBA bush 1-1, a right CTBA bush 1-2, a CTBA 110, a left trailing arm 120-1, and a right trailing arm 120-2.

in the non-tilting CTBA suspension system 100, each of the left/right CTBA bushes 1-1, 1-2, which are coupled to the left/right trailing arms 120-1, 120-2, respectively, to be fastened to a vehicle body by use of a mounting bolt, does not form the bush tilting angle, and accordingly, the left CTBA bush 1-1 and the right CTBA bush 1-2 are mounted on the same line.

Accordingly, the non-tilting CTBA suspension system 100 implements the advantage in which it is easy to tune each of the left/right CTBA bushes 1-1, 1-2 in the same bush changing direction between lateral stiffness and lateral steer.

Each of the left/right CTBA bushes 1-1, 1-2 is the same as the CTBA bush 1 described through FIGS. 1 to 6. However, there is a difference in that the left CTBA bush 1-1 is applied to the left trailing arm 120-1, whereas the right CTBA bush 1-2 is applied to the right trailing arm 120-2.

To this end, a fastening position indicator is formed on each of the left CTBA bush and the right CTBA bush. For example, the left CTBA bush 1-1 forms a left indicator 1-1A on the external circumferential surface of the bush pipe 3 to apply the left indicator 1-1A as the fastening position indicator, and the right CTBA bush 1-2 forms a right indicator 1-2A on the external circumferential surface of the bush pipe 3 to apply the right indicator 1-2A as the fastening position indicator.

In the instant case, the left indicator 1-1A forms two projections on the external circumferential surface of the bush pipe 3, whereas the right indicator 1-2A forms one projection on the external circumferential surface of the bush pipe 3, facilitating the distinction between the left/right CTBA bushes 1-1, 1-2 for the left/right trailing arms 120-1, 120-2.

The CTBA 110 is mounted to traverse the vehicle width of the vehicle to extend to the left and right wheels, is formed of a V cross-sectional or U cross-sectional or closed cross-sectional structure, and forms torsion against the turning lateral force acting as the road surface input.

Furthermore, the left trailing arm 120-1 is coupled to one side end portion of the CTBA 110 (that is, left direction of the vehicle), and provided as a place where a chassis spring is accommodated by use of a mounting bracket together with the left CTBA bush 1-1 fastened to the vehicle body by use of the mounting bolt.

Furthermore, the right trailing arm 120-2 is coupled to the opposite side end portion of the CTBA 110 (that is, right direction of the vehicle), and provided as a place where the chassis spring is accommodated by use of the mounting bracket together with the right CTBA bush 1-2 fastened to the vehicle body by use of the mounting bolt.

Accordingly, the left/right trailing arms 120-1, 120-2 enable the bush behaviors of the left/right CTBA bushes 1-1, 1-2, respectively, with respect to the turning lateral force acting as the road surface input, and generate the bump movement or the rebound movement with respect to a bump or a rebound as acting as the road surface input.

Meanwhile, FIGS. 8 to 14 illustrate the operations and effects of the CTBA bush 1 in the non-tilting CTBA suspension system 100. In the instant case, while the operations and effects of the CTBA bush 1 will be described with the right CTBA bush 1-2 by taking the left turn of the vehicle as an example, it may be understood that the left CTBA bush 1-1 differs from the right CTBA bush 1-2 only in the operation directionality upon the right turn thereof and implements the same operations and effects.

Accordingly, the non-tilting CTBA suspension system 100 may eliminate the disadvantage, in which the handling performance is improved but the ride comfort performance is degraded when the front and rear stiffness is increased, by the left and right asymmetric bridge shape due to the optimized angle ratio and the optimized thickness together with the handling/riding bridges 6-1, 6-2 of the left/right CTBA bushes 1-1, 1-2, and may eliminate the disadvantage, in which the lateral stiffness is increased but the lateral steer is degraded when the lateral stiffness is increased, by additionally securing the front gap through the optimized gap thickness ratio together with the front/rear gap stepped pipes 7-1, 7-2 of the left/right CTBA bushes 1-1, 1-2.

Figure 8:
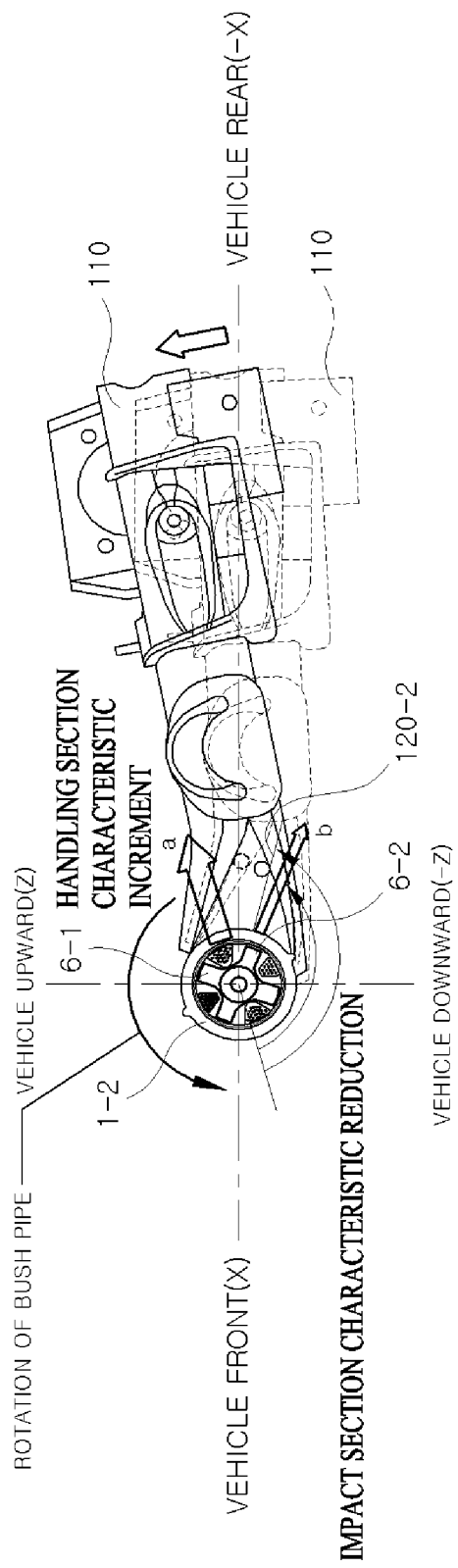
FIG. 8 is a diagram illustrating an example in which the non-tilting CTBA suspension system according to an exemplary embodiment of the present invention improves handling and ride comfort area stiffness by operation of the front and rear stiffness control portion of the CTBA bush in the road surface input load.

FIG. 8 illustrates, as the test results, handling and riding performance improved by the bush behavior of the right CTBA bush 1-2 in the non-tilting CTBA suspension system 100 subjected to the road surface input load according to the vehicle movement.

As in the case where the non-tilting CTBA suspension system 100 illustrated generates a suspension behavior from a dotted line to a solid line, the handling bridge 6-1 is positioned close to the vertical direction by the rotation of the bush pipe 3, affecting the vertical behavior which affects the handling, and the riding bridge 6-2 is positioned close to the front and rear direction by the rotation of the bush pipe 3, affecting the front and rear behavior which affects the ride comfort.

Accordingly, it may be confirmed through the analyzed results that the right CTBA bush 1-2 applied to the non-tilting CTBA suspension system 100 concentrates a handling stiffness direction (a) in a direction of about 35 degrees against the road surface input load, such that the handling bridge 6-1, which has the handling bridge thickness (Ta) (see FIG. 3) having the optimized thickness, is mounted in the handling inclined angle (K-1) (see FIG. 3) within the allowable angle range formed.

Furthermore, it may be confirmed through the analyzed results that the right CTBA bush 1-2 concentrates a riding stiffness direction (b) in a direction of about 10 degrees against the road surface input load, such that the riding bridge 6-2, which has the riding bridge thickness (Tb) (see FIG. 3) having the optimized thickness, is disposed in the riding inclined angle (K-2) (see FIG. 3) within the allowable angle range formed.

Accordingly, it may be seen that the non-tilting CTBA suspension system 100 enables a handling section increment area (for example, a range of 40 degrees) for improving the handing performance by the handling bridge 6-1 of the right CTBA bush 1-2 and enables an impact section characteristic reduction area (for example, a range of 15 degrees) for improving the ride comfort performance by the riding bridge 6-2 thereof.

As described above, the non-tilting CTBA suspension system 100 improves the Riding and Handling (R&H) performance through the left/right CTBA bushes 1-1, 1-2 applied as the CTBA bush 1.

It was experimentally proved that the bush behaviors of the left/right CTBA bushes 1-1, 1-2 in the non-tilting CTBA suspension system 100 have the same operations and effects even if the load on the suspension, such as passenger riding or cargo loading as well as the turning and traveling of the vehicle, is increased.

Figure 9:
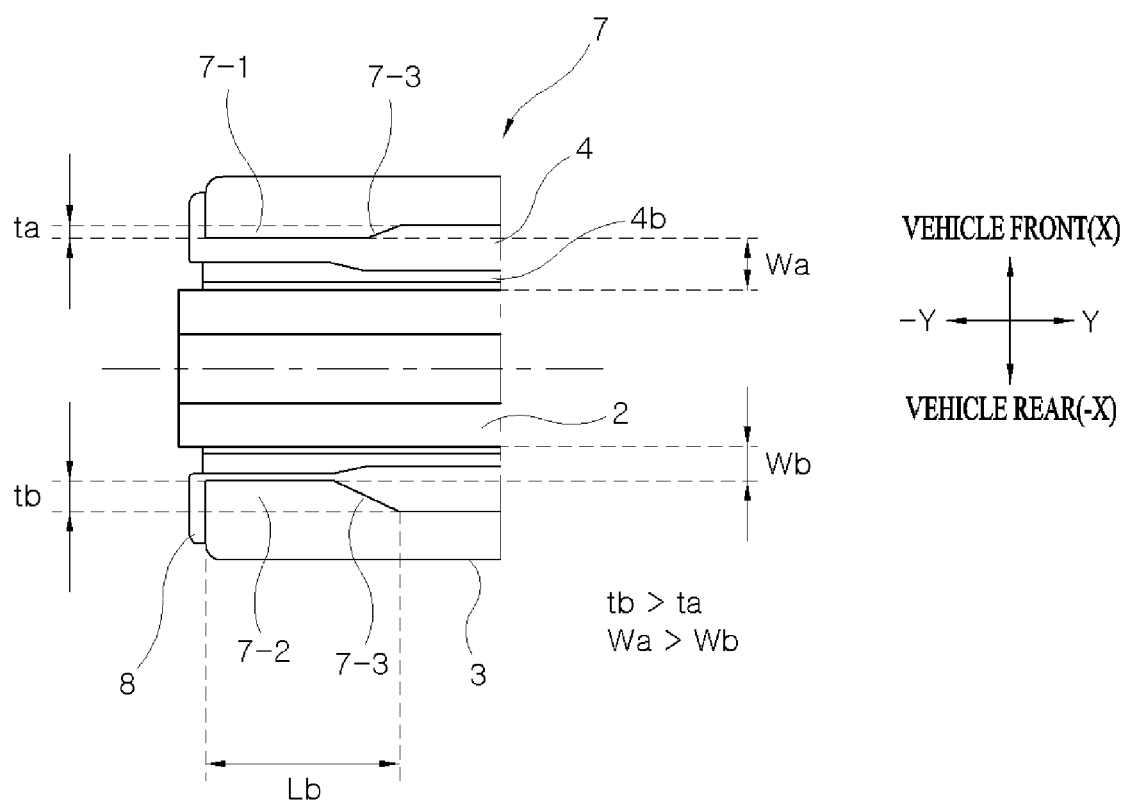
FIG. 9 and FIG. 10 are diagrams illustrating an example in which the non-tilting CTBA suspension system according to an exemplary embodiment of the present invention improves a bush linearity deformation section by operation of the axial stiffness control portion of the CTBA bush in the road surface input load.
Figure 10:
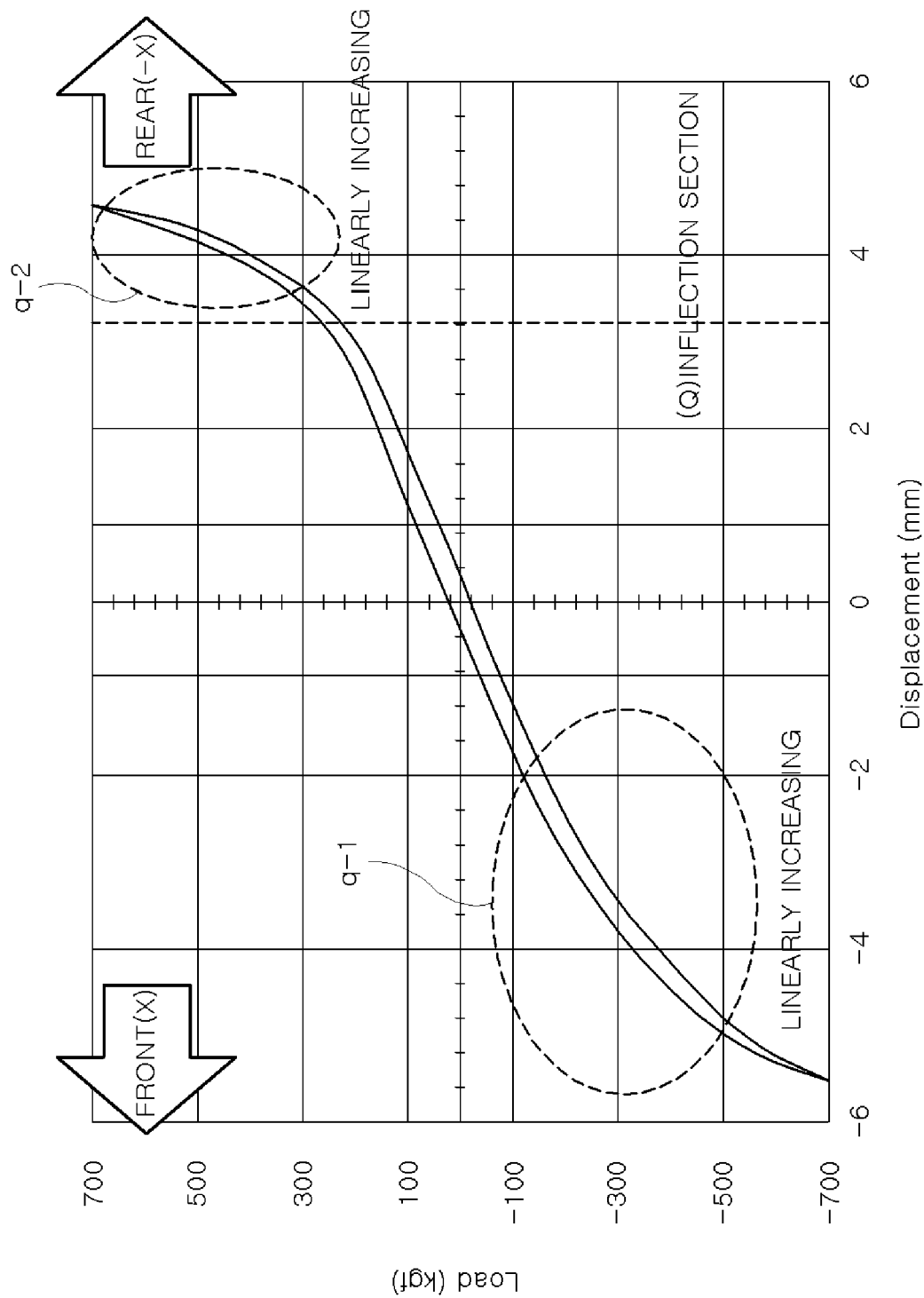

FIG. 9 and FIG. 10 illustrate as the test results of a load-deformation line diagram that the bush linearity, which contributes to improving the ride comfort performance, is improved by the bush behavior of the right CTBA bush 1-2 in the non-tilting CTBA suspension system 100 which receives the road surface input load according to the vehicle movement.

For example, it may be confirmed through the analyzed results that in the right CTBA bush 1-2, the size of the front gap width (Wa) between the bush pipe 3 and the bush core 2 is formed by the front gap stepped pipe 7-1 which has the front pipe internal thickness (ta) having a relatively small thickness against the road surface input load, and the front semicircular section of the bush pipe 3 toward the vehicle front (X) forms the primary linearity increment section (q-1) due to the front gap width (Wa).

Furthermore, it may be confirmed through the analyzed results that in the right CTBA bush 1-2, the size of the rear gap width (Wb) between the bush pipe 3 and the bush core 2 is formed by the rear gap stepped pipe 7-2 which has the rear pipe internal thickness (tb) having a relatively large thickness against the road surface input load, and the rear semicircular section of the bush pipe 3 toward the vehicle rear (−X) forms the secondary linearity increment section (q-2) due to the rear gap width (Wb).

An inflection section (Q) which distinguishes between the primary linearity increment section (q-1) and the secondary linearity increment section (q-2) is formed by optimizing a difference (Wa−Wb) between the front and rear gap widths of the front gap width (Wa) and the rear gap width (Wb) by use of the gap thickness ratio of the front pipe internal thickness (ta) of the front gap stepped pipe 7-1 and the rear pipe internal thickness (tb) of the rear gap stepped pipe 7-2.

Accordingly, it is exemplified that the difference between the front gap width and the rear gap width (Wa−Wb) may be set variously to control the position of the inflection section (Q).

Accordingly, it may be seen that the non-tilting CTBA suspension system 100 may increase the bush linearity, which contributes to improving the ride comfort, by additionally securing the front gap for the front semicircular section of the bush pipe 3 with the thickness difference between the front pipe internal thickness (ta) and the rear pipe internal thickness (tb) of the right CTBA bush 1-2.

Figure 11:
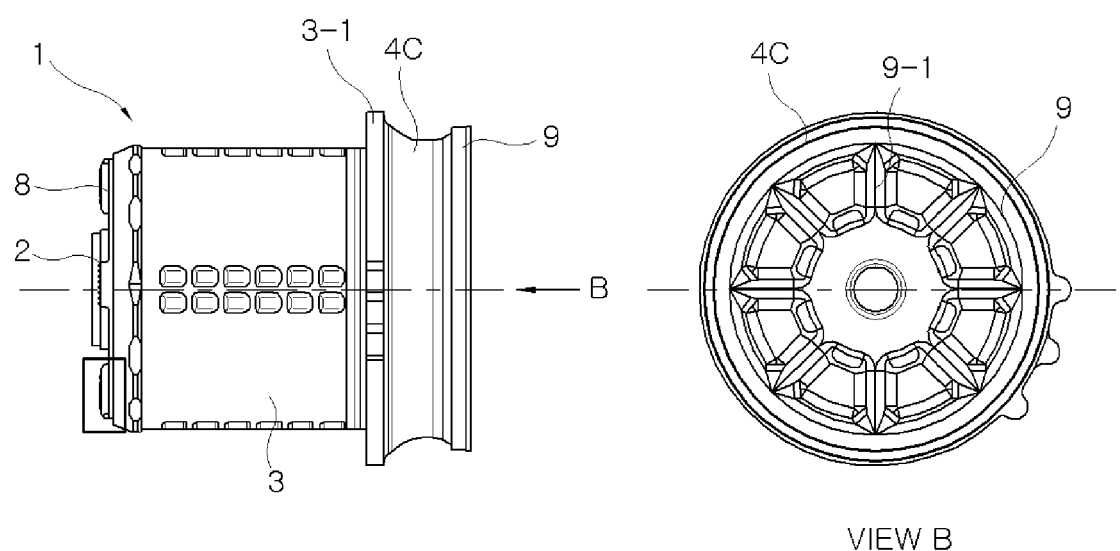
FIG. 11 and FIG. 12 are diagrams illustrating an example in which the non-tilting CTBA suspension system according to an exemplary embodiment of the present invention improves a Toe-in tendency upon the lateral force by operations of the internal/external stoppers.
Figure 12:
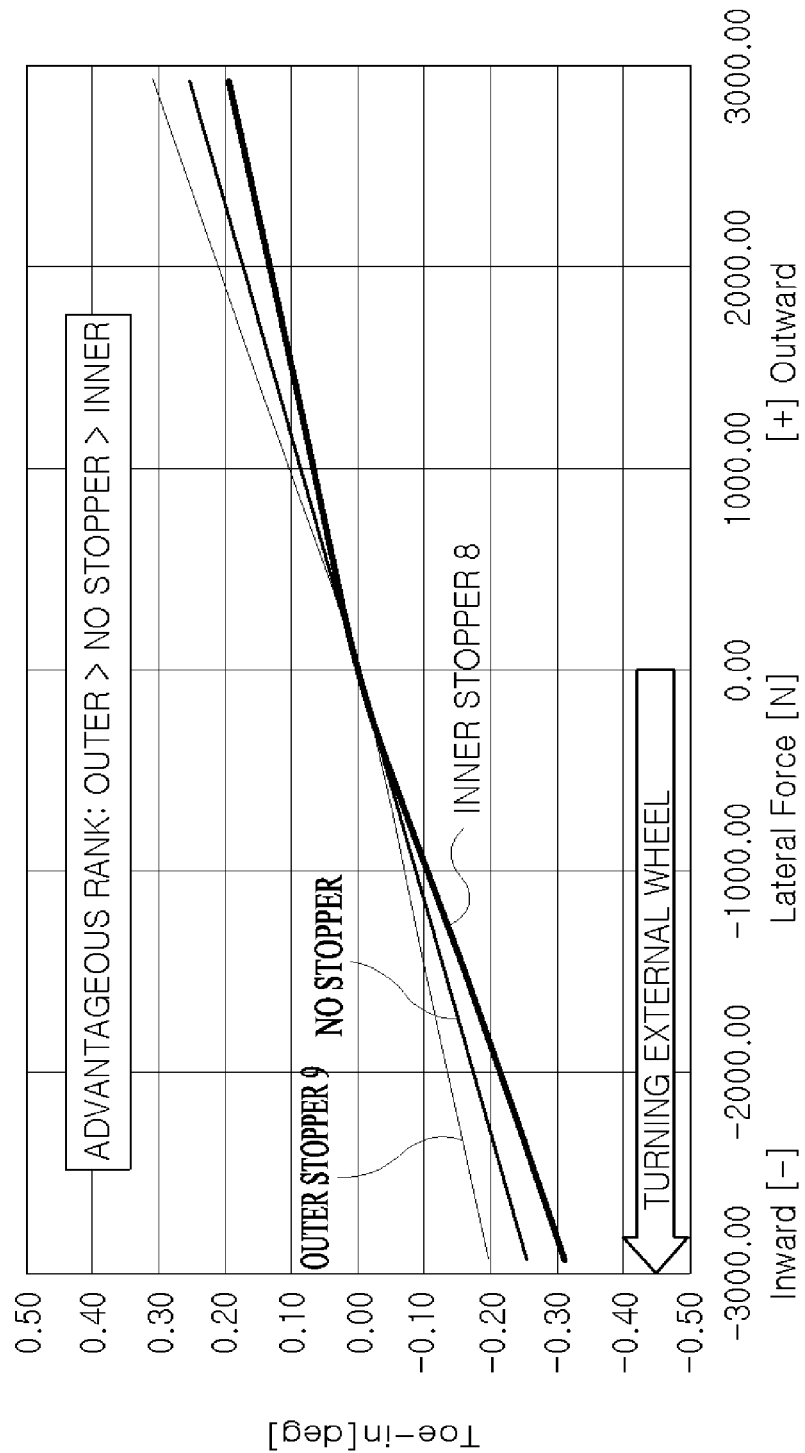

Referring to FIG. 11 and FIG. 12, in the non-tilting CTBA suspension system 100 which receives the road surface input load according to the vehicle movement, the operations of the internal/external stoppers 8, 9 of the right CTBA bush 1-2 which contributes to securing the lateral stiffness performance and the bush durability performance are exemplified as the test results of the Toe-in-Lateral Force line diagram.

As illustrated, the Toe-in-Lateral Force line diagram reflects the layout of the internal stopper 8 and the external stopper 9 which are positioned in a direction opposite to each other in the right CTBA bush 1-2.

For example, describing the Toe in tendency of the right CTBA bush 1-2 against the Lateral Force Toe out, caused by the road surface input load according to the turning of the vehicle, based on the non-application of the stopper, it may be seen that the internal stopper 8 is not large in the Lateral Force Toe out reduction performance as compared to the non-application of the stopper, whereas the external stopper 9 is large in the Lateral Force Toe out reduction performance as compared to the non-application of the stopper.

Accordingly, it may be seen that the non-tilting CTBA suspension system 100 keeps the Toe in performance by the internal/external stoppers 8, 9 of the right CTBA bush 1-2, and increases the Lateral Force Toe out reduction effect through the external stopper 9 to advantageously secure the lateral stiffness, compensating for the inferior performance of the non-tilting CTBA suspension system 100 while securing the bush durability performance.

Furthermore, it may be seen that in the non-tilting CTBA suspension system 100, the contact rib 9-1 formed on the external stopper 9 of the right CTBA bush 1-2 is embossed in a radial direction of the surface of the external stopper 9 to increase the contact efficiency using the circumferential outermost projection, also improving the handling performance.

Figure 13:
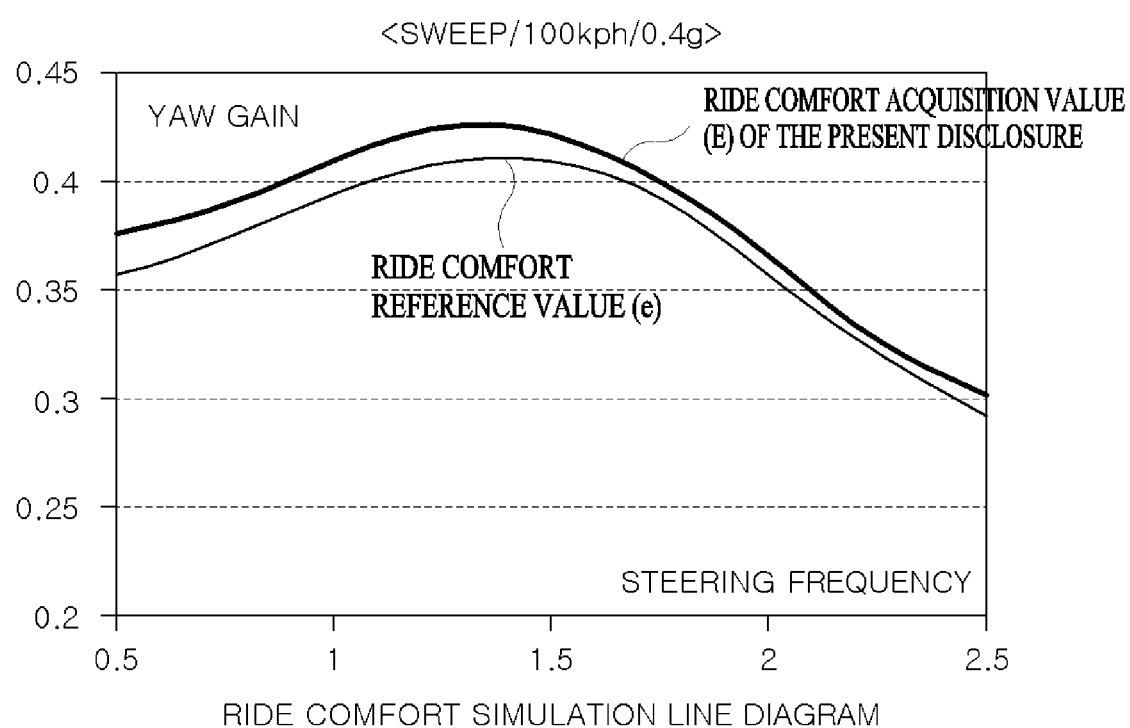
FIG. 13 and FIG. 14 are diagrams illustrating an example in which Riding and Handling (R&H) performance, improved by the non-tilting CTBA suspension system according to an exemplary embodiment of the present invention through the CTBA bush, is represented by a ride comfort performance line diagram and a steering stability performance line diagram.
Figure 14:
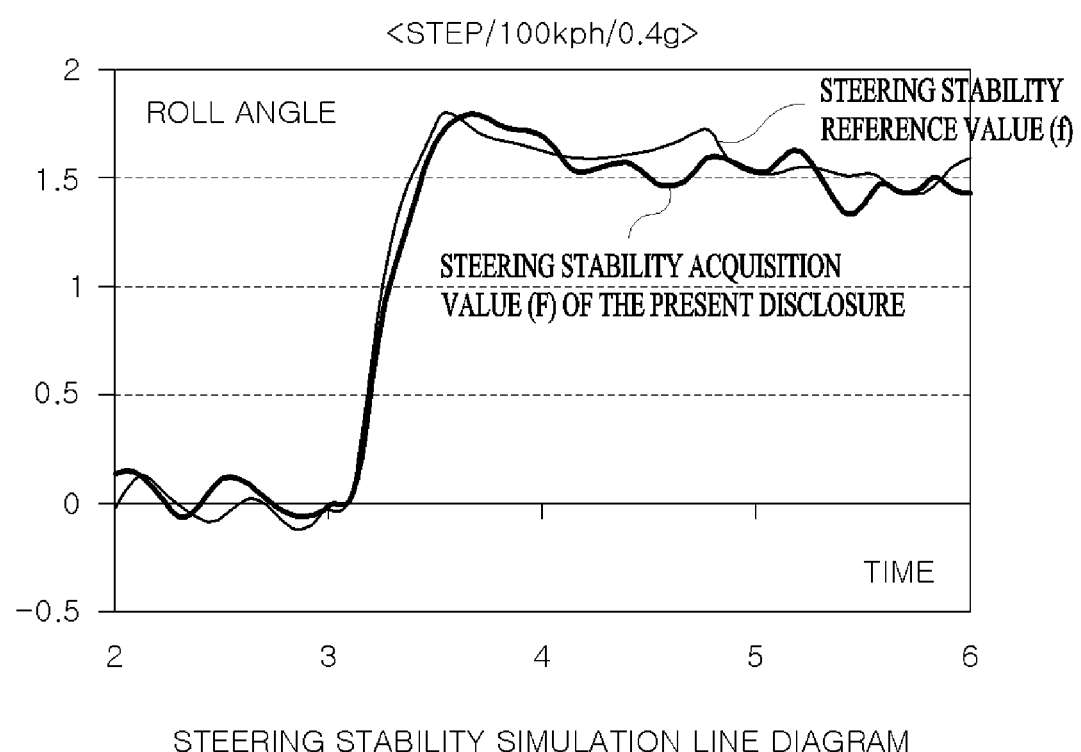

FIG. 13 and FIG. 14 illustrate the Riding and Handling (R&H) performance, which is improved by the left/right CTBA bushes 1-1, 1-2 in the non-tilting CTBA suspension system 100, as the test results of the ride comfort performance line diagram and the steering stability performance line diagram.

For example, it may be seen that in the Yaw Gain-Steer Frequency of the ride comfort simulation line diagram, a ride comfort acquisition value (E) through the non-tilting CTBA suspension system 100 follows a ride comfort reference value (e).

For example, it may be seen that in the Roll Angle-Time of the steering stability simulation line diagram, a steering stability acquisition value (F) through the non-tilting CTBA suspension system 100 follows a steering stability reference value (f).

Figure 15:
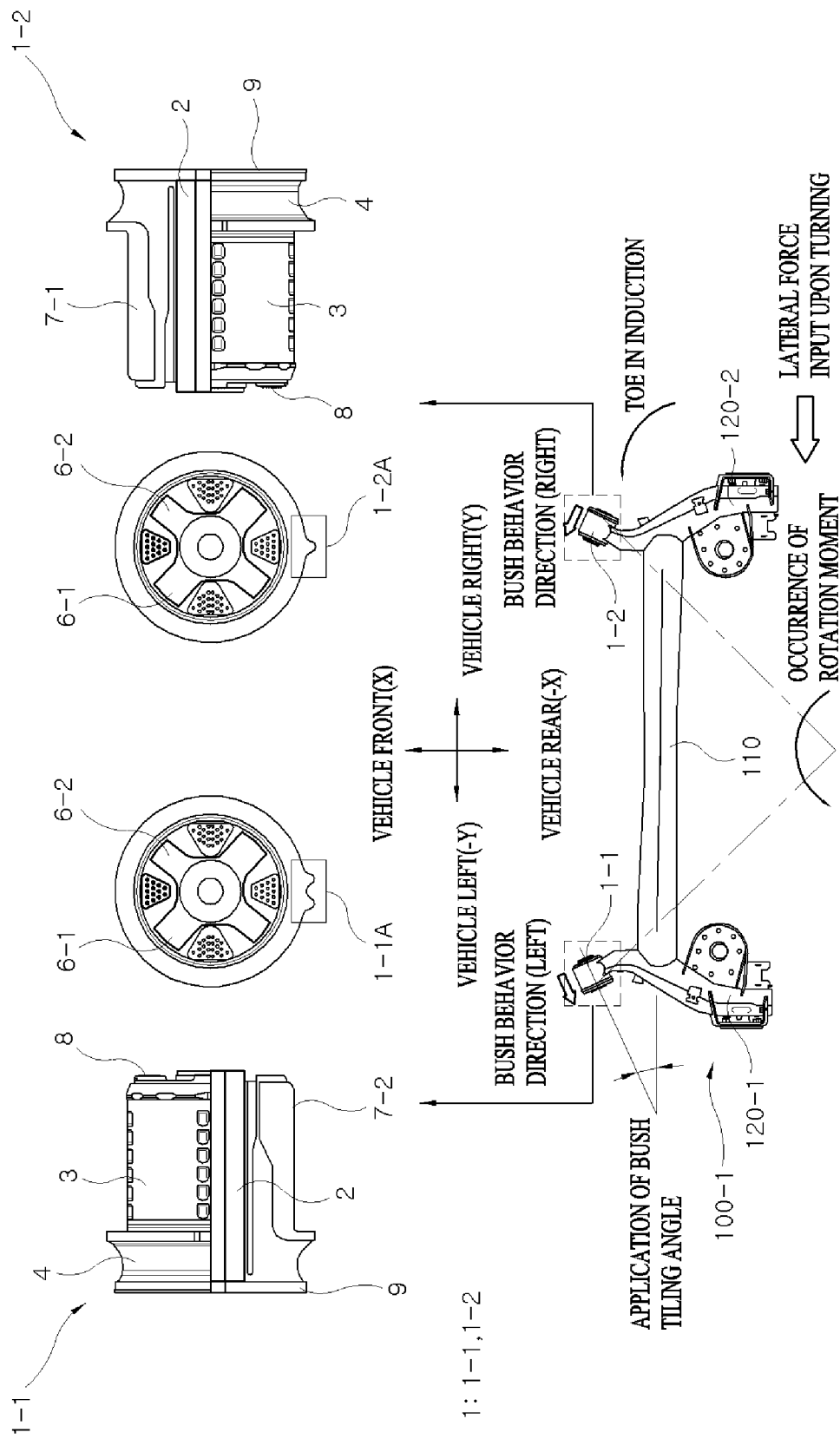
FIG. 15 is a diagram illustrating an example of a tilting CTBA suspension system of the CTBA suspension systems according to an exemplary embodiment of the present invention, to which the CTBA bush is applied.

Meanwhile, FIG. 15 illustrates an example of a tilting CTBA suspension system 100-1 of the CTBA suspension systems, to which the CTBA bush 1 is applied.

As illustrated, the tilting CTBA suspension system 100-1 includes the left CTBA bush 1-1, the right CTBA bush 1-2, the CTBA 110, the left trailing arm 120-1, and the right trailing arm 120-2.

However, in the tilting CTBA suspension system 100-1, the acute bush tilting angle is applied to each of the left/right CTBA bushes 1-1, 1-2, and accordingly, the tilting CTBA suspension system 100-1 differs only in the bush layout from the non-tilting CTBA suspension system 100, to which the acute bush tilting angle is not applied, and includes the same components.

Accordingly, the tilting CTBA suspension system 100-1 may have a slightly lower effect than the non-tilting CTBA suspension system 100, but may improve the conflicting relationship between the performance factors due to the front and rear stiffness increment, which enhances the handling performance but lowers the ride comfort performance, by the left and right asymmetric bridge shape of the handling/riding bridges 6-1, 6-2 of the left/right CTBA bushes 1-1, 1-2, and also improve the conflicting relationship between the performance factors due to the axial stiffness increment, which is advantageous for the lateral stiffness but disadvantageous for the lateral steer, by additionally securing the front gap of the front/rear gap stepped pipes 7-1, 7-2 of the left/right CTBA bushes 1-1, 1-2.

As described above, the non-tilting CTBA suspension system 100 or the tilting CTBA suspension system 100-1 according to the exemplary embodiment includes the bush mass 4 which is provided between the bush core 2, which does not generate the rotation against the external load, and the bush pipe 3, which generate the rotation against the external load, and employs the CTBA bush 1 including the stiffness control portion 5 in which the cross-sectional structure and the asymmetric bridge structure are combined, the cross-sectional structure of additionally securing a gap being formed on the internal circumferential surface of the bush pipe 3 to enhance the lateral stiffness performance and the lateral steer performance together, and the asymmetric bridge structure being formed of the X-shaped mass body 4A of the bush mass 4 to enhance the handing performance and the riding comfort performance together, significantly improving the Riding and Handling (R&H) performance in the state where the lateral stiffness and lateral steer performance are kept by mutually combining and optimizing the axial stiffness and the front and rear stiffness, which are the conflicting performance factors of the CTBA bush 1.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A Coupled Torsion Beam Axle (CTBA) bush comprising:
   a first stiffness control portion which secures a gap in a cross section of a bush pipe, the bush pipe rotated in a direction opposite to a bush mass with a road surface input load; and
   a second stiffness control portion which forms the bush mass of an X-shaped mass body, the bush mass forming the bush pipe as an external diameter and forming a bush core as an internal diameter
   wherein a handling bridge and a riding bridge have bridge inclined angles which are different from each other with respect to a center portion of a bush with different bridge thicknesses from each other.

2. The CTBA bush of claim 1,
   wherein a shape of the bush mass is formed of the X-shaped mass body in which the handling bridge and the riding bridge are crossed.

3. The CTBA bush of claim 1,
wherein a bridge thickness of the handling bridge is formed to be greater than a bridge thickness of the riding bridge.

4. The CTBA bush of claim 1,
wherein the bridge inclined angle of the handling bridge is formed at an angle greater than the bridge inclined angle of the riding bridge.

5. The CTBA bush of claim 1,
wherein the first axial stiffness control portion forms a cross-sectional structure of additionally securing a gap with a front gap stepped pipe and a rear gap stepped pipe with respect to a lateral cross-sectional center portion of the bush pipe, and wherein the cross-sectional structure of additionally securing a gap forms a front gap width formed between the front gap stepped pipe and the bush core and a rear gap width formed between the rear gap stepped pipe and the bush core.

6. The CTBA bush of claim 5,
wherein the front gap stepped pipe and the rear gap stepped pipe are formed in a predetermined section in a longitudinal direction of the bush pipe.

7. The CTBA bush of claim 5,
wherein the front gap width and the rear gap width form a difference between the front gap width and the rear gap width due to sizes of different widths from each other.

8. The CTBA bush of claim 7,
wherein the difference between the front gap width and the rear gap width occurs by forming a size of the front gap width to be greater than a size of the rear gap width.

9. The CTBA bush of claim 5, wherein a stepped surface is formed between the front gap stepped pipe and the rear gap stepped pipe and
wherein the stepped surface is formed with an inclined angle at an acute angle with respect to a longitudinal axis of the front gas stepped pipe.

10. The CTBA bush of claim 1,
wherein the bush mass is provided with an internal stopper at a first side of the bush mass and an external stopper at a second side of the bush mass.

11. The CTBA bush of claim 10,
wherein the internal stopper is positioned in a space of a void formed in the bush mass.

12. The CTBA bush of claim 10, wherein the internal stopper includes a plurality of contact projections on a contact surface thereof.

13. The CTBA bush of claim 10,
wherein the external stopper is coupled to a mass body end portion of the bush mass to be spaced from the bush pipe.

14. The CTBA bush of claim 13,
wherein the external stopper includes a contact rib which is embossed in a radial direction of a surface of the external stopper.

15. The CTBA bush of claim 1,
wherein the bush mass includes a void,
wherein the first stiffness control portion includes a pipe flange protruding in a radial direction of the first stiffness control portion, and
wherein a first end of the bush mass is open and a mass end body is provided to a second end of the bush mass to block an end of the void.

16. A Coupled Torsion Beam Axle (CTBA) suspension system including:
a CTBA bush which has a bush mass between a bush core which keeps a fixed state against a road surface input load and a bush pipe which rotates against the road surface input load and has a stiffness control portion in which a gap and an X-shaped mass body are combined, the gap being formed by a difference between width sizes of a front gap width and a rear gap width on an internal circumferential surface of the bush pipe and the X-shaped mass body being formed of the bush mass
a CTBA which is disposed to traverse a vehicle width;
a first trailing arm which is fastened to a first side of the CTBA by setting the CTBA bush; and
a second trailing arm which is fastened to a second side of the CTBA by setting the CTBA bush.

17. The CTBA suspension system of claim 16,
wherein the CTBA bush is formed with a fastening position indicator, and
wherein the fastening position indicator discriminates the first trailing arm from the second trailing arm.

18. The CTBA suspension system of claim 16,
wherein a fastening method of the CTBA bush and the first trailing arm and a fastening method of the CTBA bush and the second trailing arm do not employ a bush tilting angle so as not to generate a rotation moment by a lateral force according to turning thereof.

* * * * *